Sept. 17, 1968   P. A. BEZZERIDES ET AL   3,401,753
EARTHWORKING TOOL FOR THINNING PLANTS
Filed Feb. 7, 1966   4 Sheets-Sheet 1
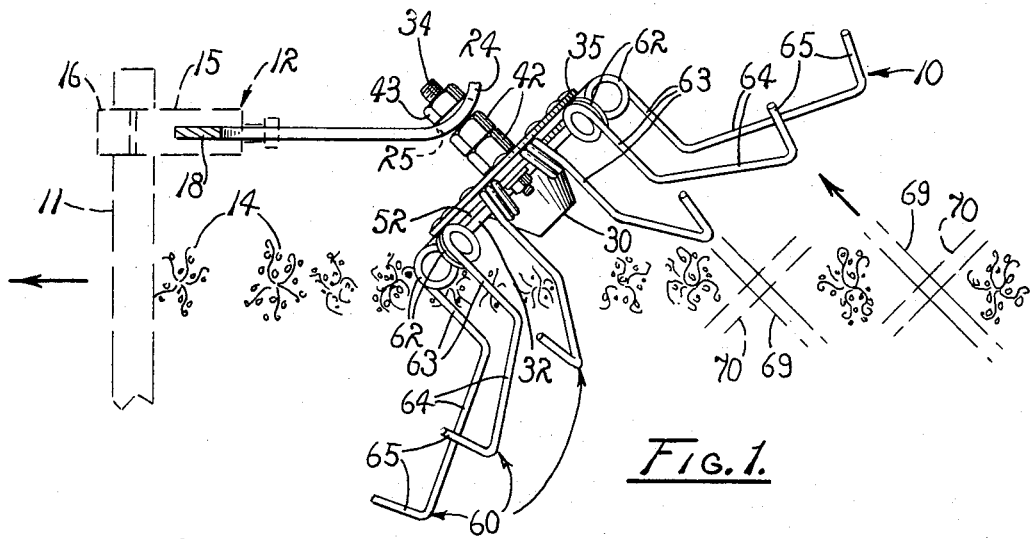
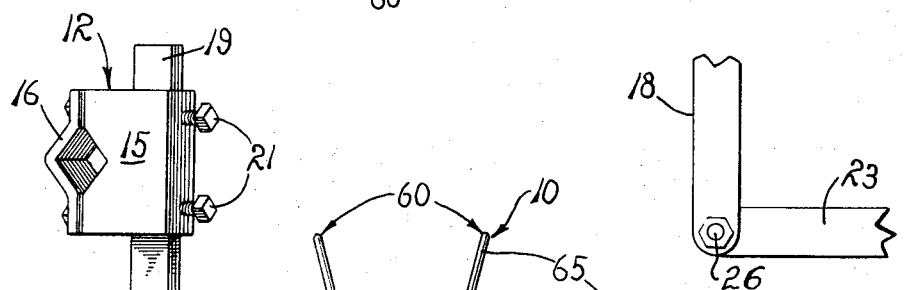
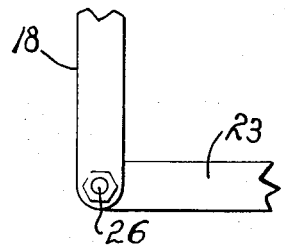
PAUL A. BEZZERIDES
ARTHUR A. BEZZERIDES
INVENTORS
Huebner & Worrel
ATTORNEYS

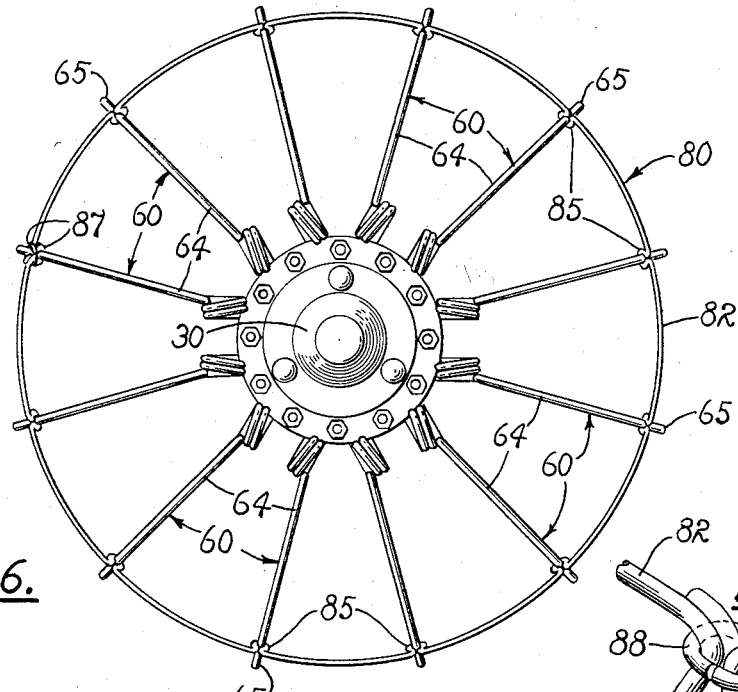
Fig. 6.
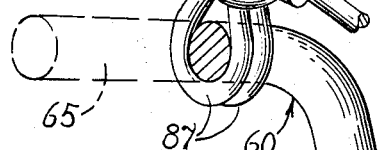
Fig. 8.
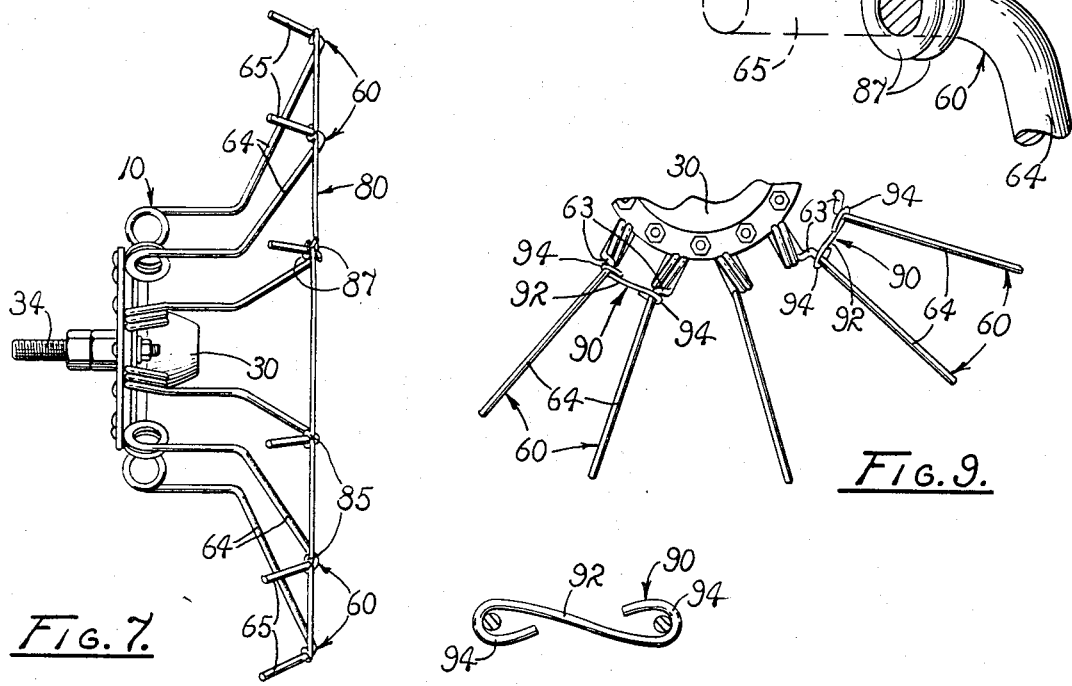
Fig. 7.
Fig. 9.
Fig. 10.
PAUL A. BEZZERIDES
ARTHUR A. BEZZERIDES
INVENTORS

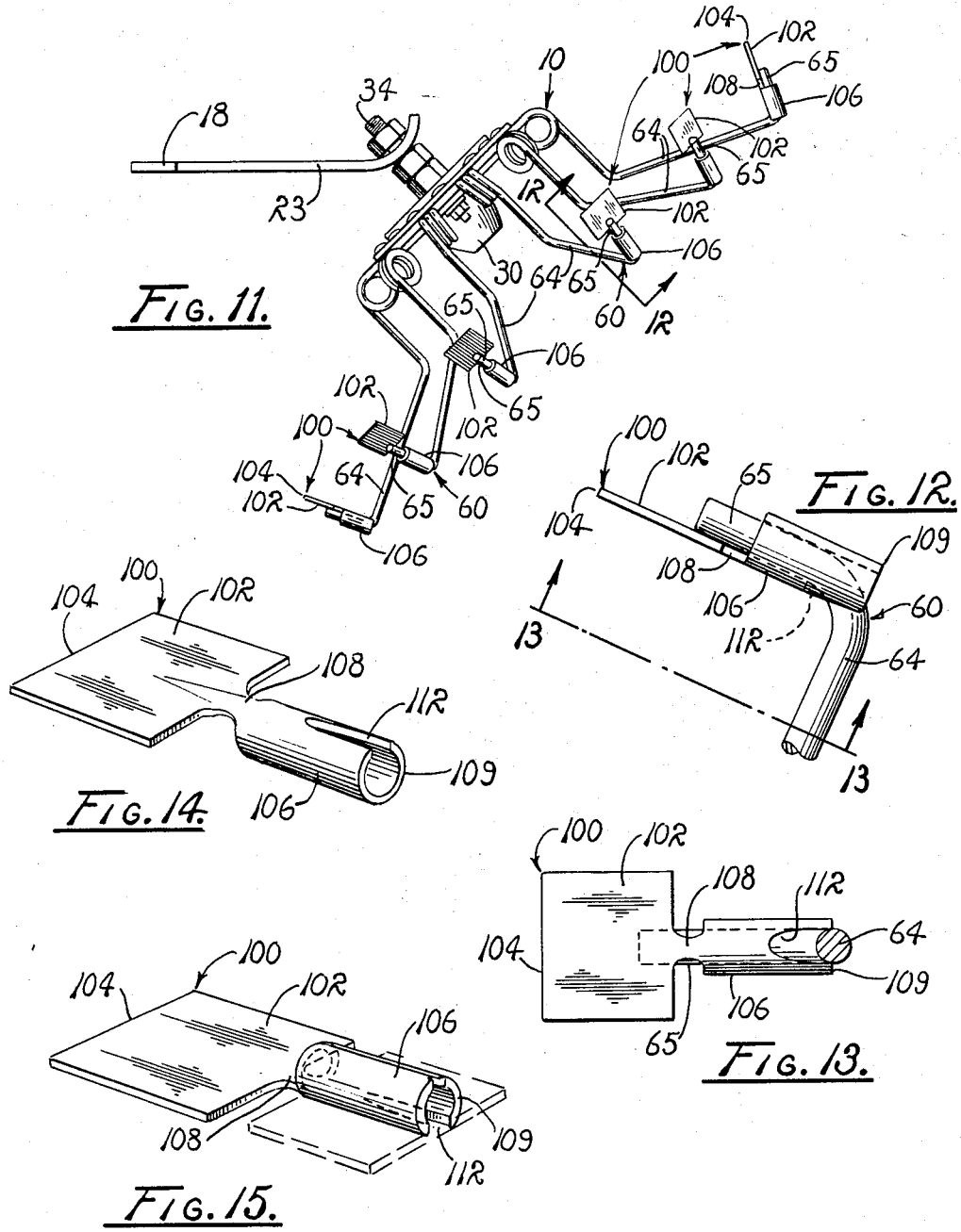

United States Patent Office 3,401,753
Patented Sept. 17, 1968

3,401,753
EARTHWORKING TOOL FOR THINNING PLANTS
Paul A. Bezzerides and Arthur A. Bezzerides, both of
P.O. Box 211, Orosi, Calif. 93647
Filed Feb. 7, 1966, Ser. No. 525,642
4 Claims. (Cl. 172—543)

ABSTRACT OF THE DISCLOSURE

An earthworking tool for thinning plants and the like adapted for earth traversing movement in a predetermined forward direction of travel longitudinally along rows of plants having a hub mounted for rotation about an axis disposed in oblique relation to said forward direction of travel including a plurality of resiliently flexible arms mounted on the hub and having outer earth engaging ends radially outwardly extended from the hub in axially offset relation for successive movement through the earth along the plant rows for removing plants and forming spaced swaths therethrough between plants remaining in the rows.

In order to insure that the plants of annual row crops, such as cotton, sugar beets, lettuce, broccoli and the like, have sufficient space to grow to full maturity, excess seedlings are removed at regularly spaced intervals. In the past, such thinning operations have most frequently been done by hand, although recently attempts have been made to mechanize such operations. Various rotary chopping blade devices have previously been employed but have not been as fully effective as desired. Many of these devices have provided a slotted rigid disc type blade which presents a plurality of peripherally disposed cutting edges as shown in the Mayberry et al. Patent No. 2,505,560. The blades are usually rigidly mounted for earth traversing movement at an angle with respect to the rows so as to be rotated during earth traversing movement with the cutting edges forming diagonal swaths across the rows. With such rigid mounting, the blades, upon encountering an obstruction in the row or caked surface soil, are either damaged, or the obstruction is uprooted tearing loose large sections of needed plants in the rows. Furthermore, the cutting edges of such rigid blades are only in earth engagement for limited periods during movement through the lower arc of blade rotation. Consequently, when working in relatively wide rows, such conventional blades do not form a swath entirely across the rows. The only solution thus far has been to increase the diameter of the blades to provide a longer period of earth contact for each cutting edge. It is apparent that such solution is unsatisfactory in view of space limitations and the further economic and handling problems allied therewith.

Other structures of the prior art, as exemplified by the Twose British Patent No. 788,250 and the Stone Patent No. 2,960,173, mount the blades on large floating frames. These structures permit the entire blade to ride over obstructions such as rocks and other debris, and to conform to depressions and elevations in the terrain traversed. With such unitary floating movement, a number of the following cutting edges on the blades may be held out of earth engagement during a portion of blade rotation, causing skipping and non-uniform plant thinning. Also the relatively thin blade edges present a minimum of frictional contact with the earth and permit erratic blade rotation. In order to overcome this problem, still other structures of the prior art provide paddle blades right-angularly extended in continuous coplanar relation to the main cutting edges which cooperate to form U-shaped pockets. While increasing blade traction, such blades have only experienced limited success. Even during optimum operation these blades have been found to clog and frequently spill earth and severed plant material onto adjacent plant areas thereby stifling plant growth.

Therefore, it is an object of the present invention to provide an improved earthworking tool for thinning plants and the like.

Another object of the present invention is to provide such an improved earthworking tool capable of forming precisely regularly spaced swaths through the rows of plants and removing a selected minimal number of plants at substantially uniform spacings along the respective rows.

Another object of the present invention is to provide such an improved earthworking tool which leaves the remaining plant areas in condition for optimum growth potential.

Another object of the present invention is to provide an earthworking tool which is capable of substantially complete removal of severed plant material from the row with a minimum of disturbance of earth in adjacent plant areas.

Another object is to provide an earthworking tool which is capable of conforming to elevations and depressions in the earth traversed.

Other objects and advantages of the present invention will be more fully apparent upon reference to the following description in the specification.

In the drawings:

FIG. 1 is a top plan view of an earthworking tool embodying the principles of the present invention shown mounted for earth traversing movement along a row of plants.

FIG. 2 is a somewhat enlarged side elevation of the earthworking tool of FIG. 1.

FIG. 3 is a somewhat enlarged fragmentary side elevation of a modified form of tool post adapted to be utilized with the tool of FIG. 1.

FIG. 6 is a side elevation of the earthworking tool of FIGS. 1 and 2 showing an earth mulching attachment mounted thereon.

FIG. 7 is a top plan view of the earth working tool with the mulching attachment of FIG. 6.

FIG. 8 is a somewhat enlarged, fragmentary perspective of the ends of the mulching attachment and the retainer for holding the attachment on the tool.

FIG. 9 is a fragmentary side elevation of the earthworking tool of FIGS. 1 and 2 showing an arm spacing device mounted between adjacent pairs of the arms.

FIG. 10 is a somewhat enlarged side elevation of one of the spacers disposed in operating position between a pair of adjacent arms.

FIG. 11 is a top plan view of the earthworking tool of the present invention, similar to FIG. 1, but showing a plurality of earth engaging blades individually mounted on the arms of the tool.

FIG. 12 is a somewhat enlarged side elevation of one of the blades of FIG. 11 and its respective mounting arm as viewed generally in the direction indicated by the arrows on line 12—12 of FIG. 11.

FIG. 13 is a top plan view of the blade when viewed in the direction of the arrows on line 13—13 of FIG. 12.

FIG. 14 is a somewhat enlarged perspective view of the blade removed from the arm of the earthworking tool.

FIG. 15 is an alternate form of blade substantially identical to the blade of FIGS. 11 through 14 but which is formed in a different manner.

Figure 4:
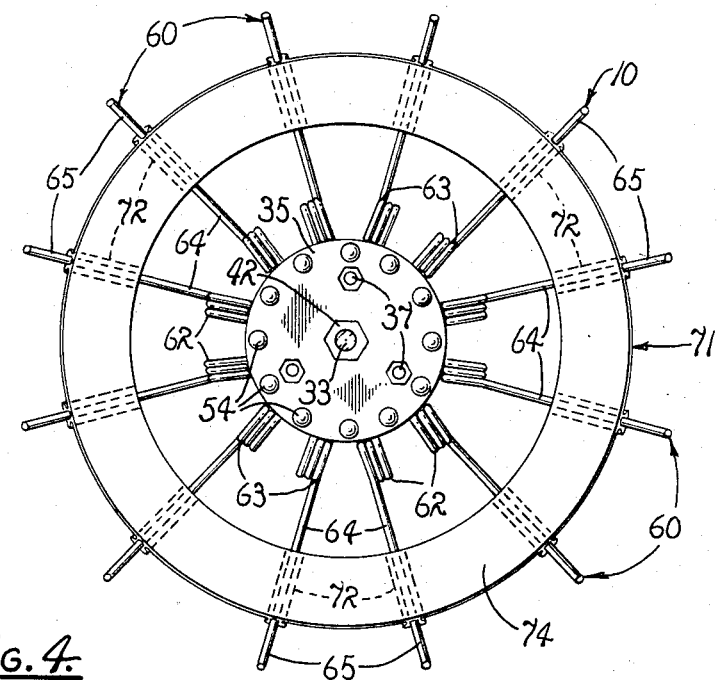
FIG. 4 is a somewhat enlarged side elevation of the earthworking tool of FIG. 1 showing a supplementary earth engaging skirt attached thereto.

Referring more particularly to the drawings, an earthworking tool embodying the principles of the present invention is generally designated by the reference numeral 10. It is adapted to be adjustably mounted on an elongated tool bar 11, shown in dashed lines, by a bracket and tool mounting post assembly 12. The tool bar 11 is adapted to be carried in earth traversing movement along a row of plants 14 on a vehicle such as a tool carrier, tractor, or the like, not shown. The tool mounting assembly 12 includes a bracket 15 which is adapted to be slidably positioned and releasably constrained on the tool by a clamp 16. An L-shaped tool post 18 provides an upper end 19 elevationally slidably disposed in the bracket and rigidly secured thereto by a pair of locking bolts 21 screw-threadably mounted in the bracket and tightly wedged against the tool post. The tool post includes a lower end 23 providing an arcuate tool mounting portion 24 thereon which has an elongated slot 25. The lower end 23 may be hingedly connected to the remaining portion of the tool post 18 at 26 to support the tool 10 in floating earth engagement, if desired, as shown in FIG. 3.

As shown in FIG. 1, the representative earthworking tool 10 of the present invention is associated with the row of plants 14. The tool includes a hub 30 having an enlarged radially extended annular flange 32. The hub is rotatably mounted on an elongated stud 33 having an outer screw-threaded end 34. An annular backing plate 35 of a larger diameter than the flange of the hub is mounted in circumscribing relation about the stud in facing relation to the flange of the hub. A plurality of mounting bolts 37 are extended through the flange and the backing plate to constrain said members in assembly.

A pair of spacer nuts 42 are screw-threadably received upon the outer threaded end 34 of the stud 33 in abutting relation to the mounting portion 24 of the tool post 18. The outer end of the stud is extended through the elongated slot 25 in the mounting portion 24 of the tool post 18 and is constrained in a desired adjusted position by a lock nut 43 screw-threadably disposed on the stud. As shown in FIG. 1, the lower end 23 of the tool post is substantially aligned with the direction of movement longitudinally along the row of plants 14, with the stud 33 of the tool defining an axis of rotation for its respective hub. Each axis is disposed preferably at a substantially forty-five degree angle to the row of plants.

An annular mounting plate 52 is disposed about the hub 30 between the flange 32 of the hub and the backing plate 35. The peripheries of the plates 35 and 52 are held together by a ring of circumferentially spaced bolts 54. A plurality of resiliently flexible arms 40 are supported in pairs between the plates 35 and 52. Each pair of arms is preferably formed from a continuous rod of spring steel material and includes an inner bight portion disposed about a respective one of the bolts 54, spring coil portions 62 radially outwardly disposed from the periphery of the plates, angularly outwardly axially extended trunk portions 63, and obtusely farther outwardly angled intermediate portions 64 having outwardly substantially right angularly axially reversedly extended ends 65. Each of the axially extended trunk portions 63 of the arms is disposed in substantially parallel adjacent relation to the corresponding portion of the adjacent arm. In such position the outer end portions 65 of the arms 60 form earth engaging members, such as prongs, which are disposed at a predetermined axial distance from the hub and angled axially toward the hub.

The prongs 65 are substantially equispaced circumferentially about the axis of the hub 30. It has been found that a tool 10 having six pairs of arms 60 functions well for the purpose of the present invention, although the number may be varied depending upon the quantity of plants 14 in a row and the degree of thinning desired. It is also significant that the prongs may be shaped into somewhat varied configurations, flatter and/or longer in shape, depending on the size and spacing of the plants.

While, in addition to their plant thinning function, the prongs 65 also effectively loosen the earth between plants 14 which additional function may be further enhanced by providing additional earth engaging or deflecting surfaces on the tool 10 for cooperative action with the prongs. An annular ring or skirt 71, formed of a suitable elastomeric material such as rubber, has been found effective for this purpose. The skirt is attached to the arms 60 in any suitable manner such as by pairs of elongated beads 72, which are formed integrally with the skirt and spaced so as to fit snugly over the angled portions 64 of the arms. When mounted on the tool, the skirt presents an earth engaging or deflecting surface 74 disposed substantially forwardly of the direction of travel and radially inwardly of the prongs. The skirt is positioned on the arms preferably a sufficient extent radially inwardly to avoid harmful contact with needed plants, while effective impelling contact with severed plants as well as with the soil loosened by the prongs.

In further demonstration of the versatility of the earthworking tool 10 of the present invention, an earth mulching attachment, generally indicated by the numeral 80, is adapted to be mounted on the arms 60. The mulching attachment provides an annularly formed rod 82 of spring steel material substantially similar to the material of the arms. The rod includes a plurality of inwardly extended looped portions 85 which are equally spaced in correspondingly spaced relation to the spacing of the pronged end portions 65 of the arms. The looped portions are adapted individually slidably to be fitted in circumscribing relation on the pronged end portions closely adjacent to the intermediate portion 64 of the arms. The mulching rod further includes opposite looped ends 78 which are successively fitted in circumscribing relation about a single selected prong end portion 65. As best shown in FIG. 8, the mulching rod is constrained in the operating position of FIG. 6 on the arms by a retainer ring 88 clamped around the ends 87 of the rod.

The earthworking tool 10 of the present invention may be further altered for varying its operational capabilities by utilizing an arm spacer device which is indicated by the reference numeral 90 in FIGS. 9 and 10. As best shown in FIG. 10, the spacer provides an elongated S-shaped rod 92 having opposite hooked ends 94. The length of the spacer is substantially less than the normal spacing between the inner ends of the arms 60 during ordinary use of the earth engaging tool 10 of FIGS. 1 and 2. When it is desired that such normal spacing of the arms be changed, the hooked ends 94 of the spacer are disposed about the inner ends of selected adjacent arms in the manner shown in FIG. 9.

In further demonstration of the versatility of the earthworking tool 10 of the present invention, a plurality of earth engaging blades 100 can be mounted on the pronged ends 65 of the arms 60. As best shown in FIGS. 11 through 14, each of the blades includes a substantially flat body portion 102 which provides an elongated forward cutting edge 104. The blade further includes an integral elongated tubular mounting shank portion 106 having a reduced dimension neck portion 108 and an opposite distal end 109. An elongated tapered notch or slot 112 is formed in the wall of the tubular shank from the distal end to a point terminating approximately midway between the ends of the shank. The shank provides a nearly imperceptible bend so that it may be drivingly forced onto the pronged end 65 of the arm in tightly clamping relation. As best shown in FIG. 12, the shank is forced on the arm to an extent permitting the intermediate portion 64 to be received within the slot 112 of the shank to preclude relative rotation between the arm and the shank. Accordingly, the body portion 102 of the blade is disposed in a plane in spaced parallel relation to the axis of the hub 30 of the tool. Such positioning disposes the cutting edge 104 substantially normal to the axis of the hub in facing relation to the effective line of travel which the blade and arm follow during earth penetrating relation through the row of plants.

The form of the blade 100 shown in FIGS. 11 through 14 is constructed of an elongated tubular section of material which is cut nearly through at a point approximately midway between its ends to leave the neck portion 108. The body portion 102 is then formed from one end of the tube my making a longitudinal slit to permit flattening of the walls of the tube in the form of the body. The form of blade shown in FIG. 15 provides a configuration substantially similar to the blade previously described but distinguishes therefrom in its manner of construction. The blade of FIG. 15 is formed from a flat piece of tool steel in which opposite saw cuts are made intermediate its ends and terminating short of its longitudinal center line to form the neck portion 108. The shank end is then formed by rolling the side members in the form of the tube shown. It is further recognized that the blades may be constructed by other methods such as die casting, forging, and the like.

*Operation*

Figure 5:
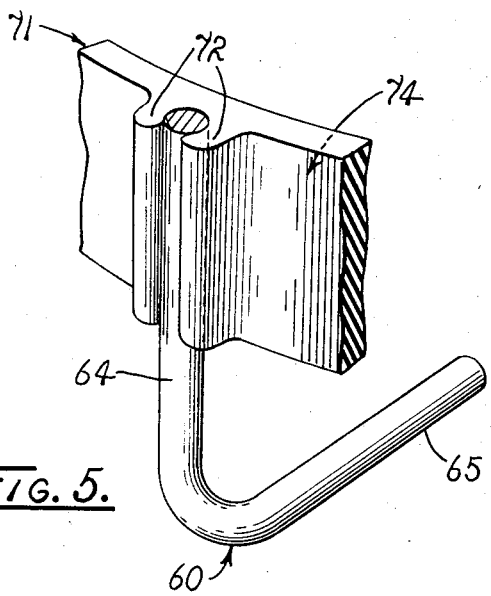
FIG. 5 is an enlarged fragmentary view of the skirt of FIG. 1 showing a method of attaching the skirt to a working tool.

The operation of the described embodiments of the subject invention is believed to be clearly apparent and is briefly summarized at this point. In all figures of the drawings except FIG. 5, the tool bar 11 and associated earthworking tools 10 are adapted to be moved by a prime mover in a forward direction from right to left. A plurality of tools may be mounted in any suitable arrangement, for use in the desired earth cultivation. As previously described, the hubs 30 are individually secured to their respective tool posts 18 at substantially a forty-five degree angle and at the same angle to their respective rows of plants 14.

During forward movement of the earthworking tool 10, the prongs 65 perambulate rotationally and obliquely through the soil and are thereby revolved about the axes of their hub 30 in a counter-clockwise direction as viewed in FIG. 2. With the prongs in earth engagement, such forward movement of the tool and rotation of the prongs coordinatively cause the prongs to move substantially diagonally transversely through the row to cut swaths 69 in substantial parallelism with the axis of the hub and in the direction of the arrows shown in FIG. 1. Also, the loosened earth is permitted to boil rearwardly over the prongs. Furthermore, during earth engagement of each prong, its respective arm 60 is flexed to position the prong farther axially outwardly from the hub 18 so as to maintain the prongs in earth contact for a longer period of time than with thinners having rigid blades. As a result, the flexing arms permit the prongs to move through the rows in lagging relation to the hub so as to have a flicking action on the earth as well as on plants 14 engaged head-on. It is estimated that in order for an earthworking tool having rigid blades to cut the same length swath as that obtained with the tool of the present invention it would have a diameter approximately twice that of the tool 10.

As a tool 10 proceeds in a forward direction along a row, its prongs 65 revolvingly enter the earth in sideways orientation relative to the diagonal path of a swath 69 and experience a turning movement away from the forward direction so as to leave the earth sideways in an opposite orientation to the swath from that at entrance, as shown in FIG. 1. Consequently, the prongs engage plants 14, or the earth surrounding plants, only glancingly or deflectively so as gently to pass the plants except for a minimal number of plants each of which happen to lie precisely in substantially instantaneously head-on alignment with a prong. In such instances, the prong turns directly into the plant to engage its roots or other portions and to remove or sever the plant from the earth. The number of plants which are so engaged by the prongs is determined to a large degree by the spacing of the plants along a row, in proportion to the interspacings between the prongs.

Another result of the sideways orientation and turning action of the prongs 65 during their oblique movement across the plant rows is the general synchronization of the prongs with the spaces between the plants 14, while effecting removal of only the desired minimal number of plants for thinning purposes. Due to their sideways movement into the soil, the prongs tend to seek paths of least resistance, which are generally afforded by the relatively unobstructed earth spaces between the plants 14. Therefore, if the inter-spacing of the prongs conforms in predetermined proportion to the spacing of the plants, the perambulating prongs become generally synchronized with the spaces between plants during forward movement of the tool 10 along a row of plants.

By reversing the oblique orientation of a tool 10 relative to a plant row, which may be readily accomplished through use of a tool post 18 having a mounting portion 24 of symmetrically opposite orientation to that shown in FIG. 1, and again moving the tool along a row, the prongs 65 further loosen the earth between plants 14 by cutting swaths 70 across the previous swaths 69. The previously loosening of the earth lessens the earth resistance to passage of a prong between plants, thereby enhancing the above synchronization effect by offering a path of least resistance to a prong not directly engaging a plant head-on.

The above described operation of the earthworking tool 10 can be altered by the addition of the skirt 71 on the arms 60. As previously noted the skirt is positioned on the arms a sufficient extent radially inwardly to avoid harmful contact with needed plants while being effective to impell severed plants and extraneous loose soil from the row. During operation, therefore, the skirt 71 supplements the clearing of loose soil from the rows and prevents accumulation of plant debris therealong.

As a prong 65 reaches the end of its swath 69 or 70 and is lifted from earth engagement, its arm 60 recoils forwardly of the hub 30 so that the prong, and associated skirt 71 when utilized, impart an additional propelling force to severed plant material positively to eject it outwardly from the row. Such flexing of the arm also permits the prong easily to ride over any obstructions such as rocks or the like encountered in the row, which further precludes tearing loose large clods from the row and plants in adjacent plant areas.

When the lower end 23 of the tool post 18 is hinged, as shown at 26 in FIG. 3, the tool 10 is moved along a row of plants 14 in floating earth engagement. This allows either a single tool, or each tool of a plurality of tools, individually to follow irregularities in the terrain so as to insure uniform earth cultivation. At the same time, the resilient action of the prongs avoids disengagement of the tool from the soil by rocks or other debris, which would otherwise occur if the tool were of rigid blade construction.

With the mulching attachment 80 mounted on the prongs 65 of the arms 60 in the above described manner, the annular rod 82 thereof forms an earth engaging member continuous about the periphery of the tool. The mulching attachment is employed when it is desired to loosen the soil, particularly along the sides of the hills or rows closely adjacent to the plants 14. Accordingly, when the mulching attachment is used, the earthworking tool 10 is laterally displaced downwardly, as viewed in FIG. 1, so that the trailing periphery of the tool clears the plants 14. During forward movement of the tool in a direction from right to left, as viewed in FIG. 1, the engagement of the prongs 65 with the earth causes rotation of the tool in the identical manner as previously described during the thinning operation.

During such movement, the mulching rod 82 effectively breaks up and pulverizes the encountered earth material which is first penetrated by the prongs. It is significant that the pulverized earth material is permitted easily to flow around and rearwardly of the mulching rod which has little tendency to accumulate earth ahead of the tool. It is noted that with the tool disposed on the lower side of the row, the lower periphery of the mulching rod tends to move the pulverized earth in a direction laterally toward the plants. This is desirable in many types of crops which require periodic deposit of earth material therearound properly to support and permit optimum growth.

With the earthworking tool 10 motivated in the same forward direction, it may also be employed on the opposite upper side of the row for mulching the earth material on the opposite sides of the hill or row adjacent to the plants. In such position, the forward or leading periphery of the tool is position so as to clear the plants. This spaces the rearward or trailing periphery laterally outwardly of the row. It is noted that in this position, rotation of the tool in the same direction tends to move earth laterally outwardly away from the plants which may be desirable in other types of crops not requiring a large accumulation of soil around the plants.

When it is desired more completely to cultivate and disturb the soil around the plants 14, between and in line with the plants, the spacer device 90 may be employed. As previously described, with the arms 60 disposed in their normally equally spaced positions, the swaths 69 and 70 are formed between the plants in crossing relation. As shown in FIG. 1, there may be areas immediately adjacent to the plants that are missed by the prongs 65. Accordingly, in order to vary the pattern of the swaths 69 and 70 so as to be disposed closer to the plants, the S-shaped rod 92 is disposed between selected pairs of the arms 60. As best shown in FIGS. 9 and 10, the hooked ends 94 are snapped over the inner ends of the adjacent arms so as to space the prongs 65 of the arms closer together. Accordingly, when the earthworking tool 10 is drawn along the row, as shown in FIG. 1, the irregular spacing of the arms causes the prongs to form swaths spaced from the normal swaths 69 and 70 in positions closer to the plants.

As previously described, the earthworking tool 10 may be further modified by mounting the blades 100 on the ends of the prongs 65 of the arms 60 when it is desired initially to form wider swaths through the rows when thinning the plants 14. As previously noted, the blades are easily disposed on the prongs in frictional wedging relation and positively constrained against rotation relative to the prongs by the meshing relation between the slot 112 in the shank 106 and the intermediate portion 64 of the arms 60.

In view of the foregoing it is readily apparent that the structure of the present invention provides an improved earthworking tool which is effective to form both regularly and irregularly spaced swaths through a row of plants which leaves spaced plant areas between the swaths permitting optimum plant growth potential. The flexible prong mounting arms permit the prongs to be off-set from the hub so as to be flexed during earth engagement and thereby to provide a flicking effect as the prongs move transversely obliquely across substantially the full width of the rows for forceful loosening of the soil. The angular orientation of the prongs relative to the hub of the tool causes the prongs to glance past needed plants while effecting selective removal of only a desired minimal quantity of plants. The earthworking tool may also be quickly and conveniently modified by the several described attachments to provide improved mulching of the earth along the plant rows laterally adjacent to the plants and longitudinally between the plants in the rows.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. An earthworking tool for thinning plants and the like adapted for earth traversing movement in a predetermined forward direction of travel longitudinally along rows of plants comprising a hub; means for mounting the hub for rotation about an axis disposed in oblique relation to said forward direction of travel; a plurality of earth engaging prongs disposed in radially and axially spaced relation from the hub; resiliently flexible arms connecting said prongs individually to the hub in angled orientation pointing radially outwardly therefrom and axially theretowards, whereby incident to hub rotation the prongs move successively through the earth along a row in a direction having a horizontal component substantially parallel to said axis resiliently to engage plants and earth surrounding the plants for removing plants disposed only in substantially head-on alignment with an earth engaging prong while forming spaced swaths through such row between the remaining plants; and an annular substantially flat ring of a resiliently flexible material having a plurality of integral beads circumferentially equally spaced on the ring in pairs for releasably individually embracing said arms radially inwardly of the prongs, said ring providing an earth engaging surface disposed substantially forwardly of the direction of travel for motivating severed plants and earth loosened by the prongs outwardly of the rows while deflecting past said remaining plants in the rows.

2. An earthworking tool for thinning plants and the like adapted for earth traversing movement in a predetermined forward direction of travel longitudinally along rows of plants comprising a hub; means for mounting the hub for rotation about an axis disposed in oblique relation to said forward direction of travel; a plurality of resiliently flexible arms having outer ends terminating in earth engaging prongs and inner ends mounted on the hub disposing the arms in normally circumferentially equally spaced axially extended relation about the axis of the hub with the prongs pointing radially outwardly therefrom in axially offset relation whereby incident to hub rotation the prongs move successively through the earth along a row in a direction having a horizontal component substantially parallel to said axis resiliently to engage plants and earth surrounding the plants for removing plants disposed only in substantially head-on alignment with an earth engaging prong while forming spaced swaths through such row between the remaining plants; and a plurality of S-shaped hooks of a length shorter than the spacing between said arms when disposed in their normally circumferentially equally spaced positions on the hub and being engageable with selected adjacent pairs of the arms to provide irregular spacing of the prongs about said axis of the hub to vary the pattern of the swaths formed through the rows and to dispose said swaths closer to said remaining plants during subsequent passes along the row.

3. An earthworking tool adapted for earth traversing movement in a predetermined forward direction of travel longitudinally along rows of plants comprising a hub mounted for rotation about an axis disposed in oblique relation to said forward direction of travel; a plurality of arms individually formed from continuous flexible rods having inner portions rigidly mounted on said hub in circumferentially spaced relation, spring coil portions outwardly adjacent to the hub, axially outwardly extended trunk portions, intermediate portions obtusely angularly radially outwardly extended from said trunk portions, and prong portions substantially right angularly reversibly extended from said intermediate portions; and a plurality of earth engaging blades having shank portions individually releasably mountable on said prong portions of the arms and being engageable with said intermediate portions of the arms in spaced relation to the hub to preclude relative rotation between the blades and their respective prong portions, each of said blades having an elongated cutting edge constrained in an operating position substantially normal to said axis of the hub by the engagement of said shank portions with said intermediate portions of the arms.

4. The earthworking tool of claim 3 in which said blades individually provide elongated tubular shanks drivingly fitted to said prong portions of the arms, each of said shanks including an elongated tapered notch to receive the intermediate portion of its respective arm to preclude relative rotation of the blade on the arm so as to maintain said cutting edge in said operating position.

References Cited

UNITED STATES PATENTS

| | | | |
|---|---|---|---|
| 706,160 | 8/1902 | Christianson | 172—510 |
| 2,908,130 | 10/1959 | Van der Lely et al. | 56—400 X |
| 2,912,055 | 11/1959 | Buddingh et al. | 172—526 |
| 3,010,526 | 11/1961 | Van der Lely et al. | 172—523 X |
| 3,032,121 | 5/1962 | Carter | 172—556 X |
| 3,218,791 | 11/1965 | Van der Lely et al. | 56—400 X |
| 3,314,486 | 4/1967 | Remy | 172—543 |

FOREIGN PATENTS 201,335  6/1958  Austria.

ABRAHAM G. STONE, *Primary Examiner.*

S. C. PELLEGRINO, *Assistant Examiner.*